United States Patent Office 3,519,325
Patented July 7, 1970

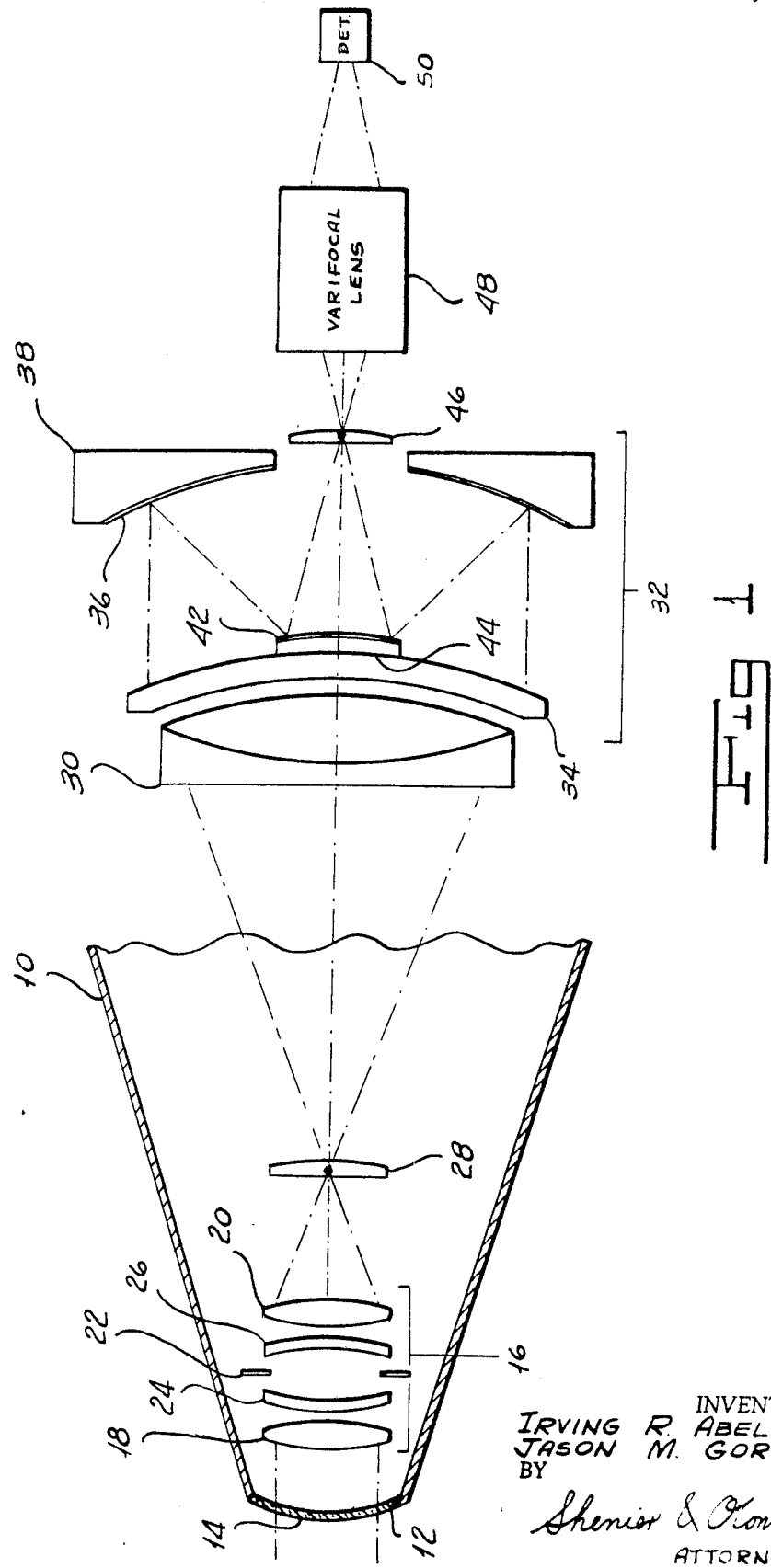
July 7, 1970     I. R. ABEL ET AL     3,519,325
HIGH APERTURE WIDE FIELD VARIFOCAL SCANNING SYSTEM
Filed Oct. 8, 1965     2 Sheets-Sheet 1
INVENTORS
IRVING R. ABEL
JASON M. GORDON
BY
Shenier & O'Connor
ATTORNEYS

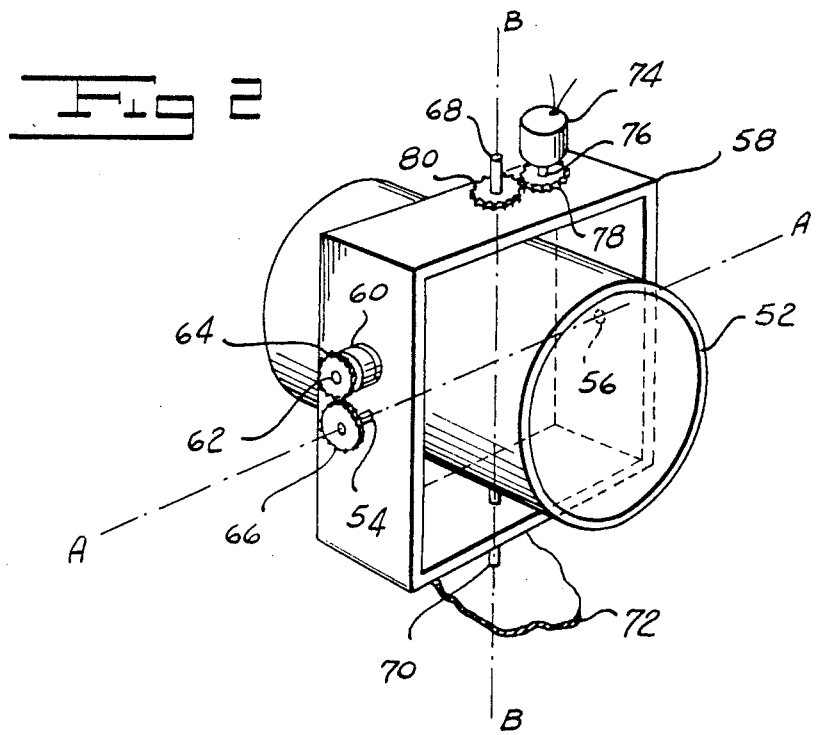
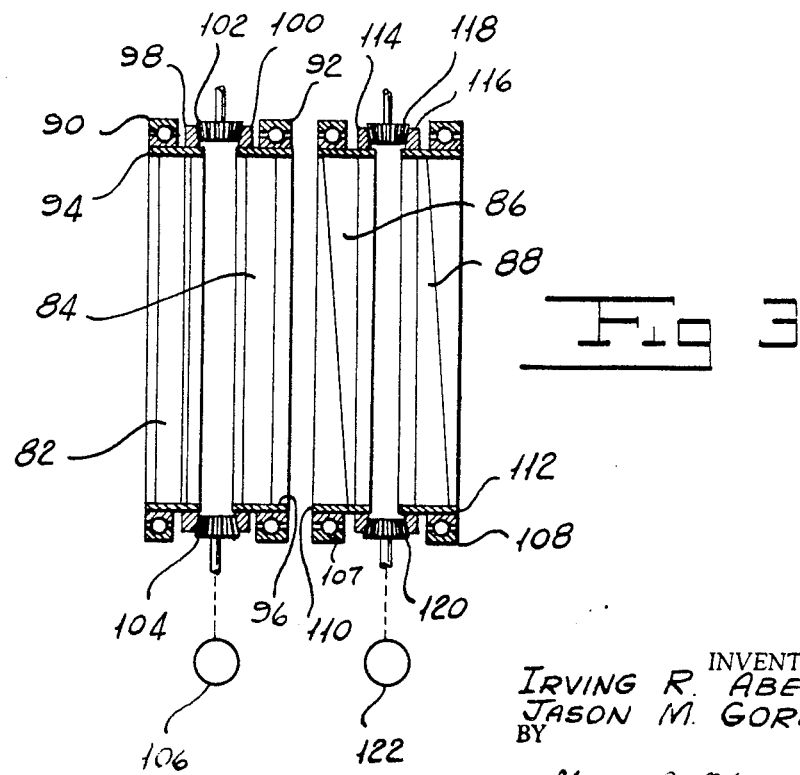

3,519,325
HIGH APERTURE WIDE FIELD VARIFOCAL SCANNING SYSTEM
Irving R. Abel, Lexington, Mass., and Jason M. Gordon, Katonah, N.Y., assignors to United Aircraft Corporation, East Hartford, Conn., a corporation of Delaware
Filed Oct. 8, 1965, Ser. No. 494,153
Int. Cl. G02b 17/00, 17/04
U.S. Cl. 350—6                                12 Claims

ABSTRACT OF THE DISCLOSURE

A high aperture wide field angle varifocal scanning system in which a telescope optical system having a small aperture and wide field angle end and having a large aperture and narrow field angle end, an imaging system having a first end providing a large aperture and narrow field angle and a second end providing a small aperture and wide field angle and a varifocal lens are mounted in series in a body having a conical nose with a window, with the small aperture and wide field angle end of the telescope system adjacent the window and with the first end of the imaging system adjacent the large aperture and the narrow field angle end of the telescope system and with the varifocal lens adjacent the second end of the imaging system. Means is provided for scanning the image provided by the telescope system.

---

Our invention relates to an optical system and more particularly to a high aperture, wide field, varifocal scanning system which is especially adapted for use in the nose of a missile.

Missile guidance and control systems require external vision to permit them to respond to objects to afford the desired control. The optical system providing the required vision should give high aperture, wide angle coverage. It should scan the field and it is desirable that it provide continuously variable magnification. It is desirable that it be compact.

Aerodynamic considerations dictate a missile configuration including a nose tapering to a relatively small diameter. Usually objects in front of the missile or the like are of more significance than those behind so that it is preferable that the optical system for a missile be located in the nose. It will readily be apparent that the optical desiderata outlined above are inconsistent with aerodynamic design of the missile. That is, in optical systems of the prior art, in order to provide high aperture and wide field coverage with scanning, a large diameter objective lens is necessary, which requirement is inconsistent with a small diameter missile nose.

We have invented an optical system which overcomes the defects of optical systems of the prior art. Our invention provides high aperture, wide angle coverage, scanning and variable focal length by providing a form having a minimum front end diameter adapted to be shaped to conform to the taper of a missile nose. Scanning occurs over a narrow internal angle to cover a wide external field angle. We provide means for scanning displaced from the missile nose in order to minimize the diameter of the front end. At the same time the large diameter section of our system is relatively narrow so as to provide for a compact system. The characteristics of our system arrangement are such as to provide for a minimum size of varifocal lens system.

One object of our invention is to provide an optical system which overcomes the defects of optical systems of the prior art.

Another object of our invention is to provide an optical system which is especially adapted for use in the nose of a missile.

A further object of our invention is to provide an optical system with a high aperture and wide angle coverage.

A still further object of our invention is to provide an optical system with scanning and with continuously variable magnification.

Yet another object of our invention is to provide a high aperture, wide field, varifocal scanning system which is compact.

Other and further objects of our invention will appear from the following description.

In general our invention contemplates the provision of a system in which the front end comprises a fixed wide-angle lens having a high aperture (low $f$-number) but a relatively small diameter. This lens corresponds to the eyepiece of a telescope. Extension of the system into the missile is obtained by the telescope in which the exit end is of large diameter and the emerging field angle is reduced over the entering field angle by a factor approximately equal to the magnifying power. Thus a wide angle, small aperture light cone is transformed into a narrow angle, large aperture light cone. Scanning may be then effected over this reduced field angle. This simplifies the scanning mechanism. Furthermore, since the field angle of light entering the imaging system is reduced and since the instantaneous field viewed is a portion of the reduced overall coverage, the angular coverage of the first part or large end is small and can be made quite compact by using a short focal length (catadioptric) configuration. By establishing a second focal plane at the field lens, that is, by inserting a focal plane prior to the detector, we are enabled to employ a much smaller varifocal lens than would otherwise be required. The varifocal component is minimized by using a conjugate distance to the second focal plane substantially shorter than the focal length of the catadioptric system. While this is done at the expense of covering an increased field angle, we obtain the transformation in the imaging system from a large aperture, narrow angle coverage to a small aperture, wide angle coverage.

In the following specification when we employ the term "high aperture," we do not mean large aperture. High aperture means a relatively large ratio between aperture and focal length. Otherwise stated, a high aperture is present when there is a low $f$-number (focal length divided by the aperture diameter). By "wide angle" we mean the coverage of a large external field. The narrow angle of the light beam emerging from the telescope corresponds to a wide external field angle. Thus when a transformation is made between a fixed reversed telescope and the imaging system, it is from a small aperture, wide field angle to a large aperture, narrow field angle.

In the accompanying drawings which form part of the instant specification and which are to be read in conjunction therewith and in which like reference numerals are used to indicate like parts in the various views:

FIG. 1 is a schematic view of our high aperture, wide field, varifocal scanning system mounted in the nose of a missile.

FIG. 2 is a perspective view of one form of scanning arrangement which we may employ in our system.

FIG. 3 is a sectional view of an alternate form of scanning system which we may employ.

Referring now to FIG. 1 of the drawings, our system is especially adapted for use in the nose 10 of a missile, which nose tapers to a relatively small diameter opening 12 in which we mount a window 14.

Immediately behind the window 14 we mount a wide-angle lens system 16 of any suitable type known in the art. The wide-angle lens system may, for example, be of the symmetrical lens class and include two relatively thick lenses 18 and 20 having a stop 22 therebetween and a pair of thin lenses 24 and 26 having rather deep curves. Since the operation of wide-angle lenses per se is known in the art, we will not describe it in detail. Lens system 16 forms the wide field end of our fixed reversed telescope. That end is what normally would be the eyepiece end of the telescope.

Our fixed reversed telescope includes a field lens 28 positioned at the first focal plane of our system. A lens 30 which normally would be the objective lens of the telescope acts as a collimating lens to collimate the rays entering the lens and coming from the field lens 28. Owing to our fixed reversed telescope arrangement at the collimating end we have a large aperture but relatively smaller field which is reduced from the field of the lens system 16 by the magnification power.

We provide a catadioptric imaging system 32 behind the collimating lens 30. Collimated rays leaving the lens 30 pass through a lens 34 of the system 32 and impinge on the reflecting surface 36 of a primary mirror 38 forming part of the system 32. Upon leaving the surface 36, rays are reflected back and onto a central focusing reflective surface 42 carried by a support 44 mounted on the central area surface of the lens 34. After being reflected by the surface 42, rays pass through a second field lens 46 located in the second focal plane of the system.

A varifocal lens 48 receive rays passing through the field lens 46 and focuses them at a detector 50. The varifocal lens 48 may be of any suitable type known to the art. Generally the lens 48 is a lens system, part of which is movable and so designed as to have correction for lens aberrations and continual sharp focusing of the image. The lens has a constant $f$-value as the focal length is changed and, as is known in the art, gives the effect of moving toward or away from an object being viewed. Since the varifocal lens per se does not form a part of our system, it will not be described in detail. Similarly the detector 50 may be any appropriate detector known to the art such, for example, as a television camera tube, a two-dimensional array of infrared elements or an infrared detector or the like. We prefer a detector providing a two-dimensional image.

The relative focal lengths of the catadioptric system 32 and the varifocal lens are such as to transform a large aperture, narrow field into a small aperture, wide field. This is made possible by the introduction of the secondary focal plane at the field lens 46. We are able to use a relatively small diameter varifocal lens 48. Moreover, the use of a folded, catadioptric configuration for the system 32 enhances the compactness of our system.

In one form of scanning system we may employ, we rotate the imaging system 32, the varifocal lens 48 and the detector 50 as a unit about two axes relative to the fixed reversed telescope. Referring to FIG. 2, we have shown one arrangement for producing this scanning motion. In that arrangement we may mount the system 32, the lens 48 and the detector 50 in a suitable housing 52. Respective stub shafts 54 and 56 rotatably support the housing 52 on a gimbal 58 for movement around a generally horizontal axis A—A as viewed in FIG. 2. A drive motor 60 having a shaft 62 carrying a gear 64 which engages a gear 66 on shaft 54 is adapted to be supplied with a voltage causing the motor to drive its shaft to direct housing 52 around the axis A—A. Respective stub shafts 68 and 70 rotatably support gimbal 58 on the missile frame 72 for movement around a generally vertical axis B—B as viewed in FIG. 2. Frame 72 carries a motor 74 having an output shaft 76 which drives a gear 78 meshing with a gear 80 on shaft 68. Motor 74 is supplied with a voltage in a manner known to the art to drive shaft 76 to rotate housing 52 around the axis B—B.

Referring to FIG. 3, we have shown an alternate scanning arrangement which is more compact than that shown in FIG. 2. In that arrangement we dispose respective pairs of counter-rotating wedges 82 and 84 and 86 and 88 between the collimating lens 30 of the reversed telescope and the imaging system 32. This system is known to the art and will therefore not be described in detail. The small angles of deviation of the optical axis make the system of rotating wedges of special advantage in the instant invention. Each wedge of the set of two counter-rotating wedges is represented by a vector which rotates about the optical axis. The position of the vector represents the plane which is formed by the vector and the optical axis in which plane the deviation takes place. The vector addition will be understood by those skilled in the art. Let $W_1$=angular deviation of the first wedge and let $W_2$=angular deviation of the second wedge and $\theta$=the angle of rotation.

Then in the horizontal direction, the components are $W_1 \sin \theta$ and $W_2 \sin \theta$ in which the vector components lie in opposite directions. In the vertical direction, the components are $W_1 \cos \theta$ and $W_2 \cos \theta$ in which the vector components lie in the same direction. Thus if $W_1 = W_2$, the horizontal components cancel and the vertical components will add giving a deviation of $2W_1 \cos \theta$ in the vertical direction, thus providing a vertical scan. The initial orientation of the wedges may be such as to provide a scan in any desired plane containing the optical axis.

In this alternate arrangement the imaging system 32, lens 48 and detector 50 are stationary. A first pair of circular bearings 90 and 92 rotatably support frames 94 and 96 for movement around a common axis. We provide frames 94 and 96 with ring gears 98 and 100 adapted to be driven by bevel gears 102 and 104. When one of the gears 102 or 104 is driven, as by a motor 106, the two wedges 82 and 84 rotate in opposite directions around their common axis to provide a linear scan as described above.

A second pair of circular bearings 107 and 108 rotatably support frames 110 and 112 carrying wedges 86 and 88 for movement around the same axis as that around which wedges 82 and 84 rotate. Frames 110 and 112 carry ring gears 114 and 116 engaged by bevel gears 118 and 120. A motor 122 is adapted to be energized to drive bevel gear 120, for example, to rotate wedges 86 and 88 in opposite directions around the system axis. We so arrange the relative disposition of the pair of wedges 82 and 84 with respect to the pair of wedges 86 and 88 that the latter wedges provide a linear scan along a line which is perpendicular to the line along which the first pair of wedges scan.

In operation of our scanning system, radiation entering through the window 14 travels along the dot-dash lines shown in FIG. 1. After first passing through the wide-angle lens system 16, it travels through the field lens 28 to the collimating lens 30 and thence to the imaging optical system 32. In passing through that system after traversing lens 34, it impinges on reflecting surface 36, is directed back to the focusing reflecting surface 42 which directs the radiation to the second field lens 46 located at the second focal plane of the system. Next, radiation passes through the varifocal lens system 48 which directs it to the detector 50.

The small aperture and wide field at the nose window 14 are transformed by our fixed reversed telescope system to a large aperture and relatively narrow field at the collimating lens 30. Optical system 32 retransforms these factors to provide a small aperture and wide angle coverage, permitting us to employ a relatively small diameter varifocal lens 48. The folded catadioptric configuration of the system 32 reduces the length of the system.

Where we employ the scanning arrangement shown in FIG. 2 the imaging optical system 32, the varifocal lens arrangement 48 and the detector 50 all are mounted on a support member such as the housing 52 which is rotated around mutually perpendicular axes in such a manner as to provide the desired line of sight. Alternatively, we may mount the optical system 32, the varifocal lens system 48 and the detector 50 in a fixed position and dispose the counter-rotating wedge pair arrangement of FIG. 3 between the collimating lens 30 and the entry lens 34 of the catadioptric imaging system 32.

In our arrangement the minimum sized front end diameter is determined by the illumination and field coverage requirements. It is established at the wide field end of the reversed telescope. The ratio of focal lengths is equal to the magnifying power of the telescope and represents a compromise between aperture and field angle. That is, the aperture of the collimating lens 30 is increased over the entrance pupil and the field angle is reduced approximately by this magnifying power. In that manner we take advantage of the location of larger cross-sectional area at a point spaced back in the nose 10 from the window 14. The reduced angular field corresponding to the total objective field coverage provides a highly favorable condition for scanning. For example, a plus or minus 40-degree scan requires only plus or minus 10-degrees scan after a four-power reversed telescope. Moreover, a 32-degree instantaneous field in objective space corresponds to 8-degrees after the fixed reversed telescope.

It will be seen that we have accomplished the objects of our invention. We have provided a high aperture, wide field, varifocal scanning system. Our system is especially adapted for installation in the nose of a missile or the like. It overcomes the inherent inconsistency between aerodynamic requirements for a missile nose and the optical desiderata for a scanning system. It is extremely compact for the results achieved thereby.

Having thus described our invention, what we claim is:

1. In an aerodynamic body, a conical nose, a window in said nose for admitting radiation into the body, a first optical system having an entry end providing a wide field angle and a small aperture, a second optical system optically aligned with said first system and having an exit end providing a wide field angle and a small aperture, said second optical system further comprising means optically aligned between said first system and said exit end for transforming a large aperture and narrow field angle to a small aperture and wide field angle and means mounting said first and second systems in said body with said entry end adjacent said window and with said exit end remote said window.

2. An optical assembly including a first optical system having a small aperture, wide field angle entry end and a large aperture, narrow field angle exit end optically aligned with said entry end, a second optical system optically aligned with said first system, said second system having a large aperture, narrow field angle entry end and a small aperture, large field angle exit end optically aligned with said entry end, said second system comprising a folded catadioptric optical system optically aligned between the exit end of the first system and the exit end of the second system for transforming the large aperture and narrow field angle at the exit end of the first system to a small aperture and wide field angle at the exit end of the second system and means mounting said systems with said entry end of the second system adjacent the exit end of the first system.

3. An optical assembly as in claim 2 wherein said first optical system is a reverse telescope system and wherein a varifocal lens is optically aligned with said second optical system.

4. An assembly as in claim 2 including means for scanning the image provided by said first optical system.

5. An assembly as in claim 2 including means for driving the catadioptric system to scan the image provided by said first optical system.

6. An assembly as in claim 2 including an optical scanner disposed between said first optical system and said second optical system.

7. An assembly as in claim 2 in which said second optical means comprises a varifocal lens and means mounting said catadioptric system and said varifocal lens in series with the catadioptric system adjacent the exit end of the first optical system.

8. An optical assembly as in claim 3 in which said telescope system includes a wide angle lens at its first end.

9. An optical assembly as in claim 3 including a detector associated with said varifocal lens.

10. An optical assembly as in claim 3 in which said second optical system is of a folded catadioptric configuration.

11. An optical assembly as in claim 3 including an optical scanner between said telescope and said second optical systems.

12. An optical assembly as in claim 3 including means for rotating said second system and said varifocal lens as a unit about mutually perpendicular axes.

References Cited

UNITED STATES PATENTS

| 2,719,457 | 10/1955 | Tripp | 350—45 X |
|---|---|---|---|
| 2,930,894 | 3/1960 | Bozeman | 350—7 X |
| 2,966,591 | 12/1960 | McCartney | 350—7 X |
| 3,083,611 | 4/1963 | Ziolkowski, et al. | 350—6 X |
| 3,226,721 | 12/1965 | Gould | 350—6 |
| 3,244,885 | 4/1966 | McHenry | 350—7 X |
| 3,274,886 | 9/1966 | Rosin | 350—27 |
| 3,310,877 | 3/1967 | Slater | 350—22 |

DAVID SCHONBERG, Primary Examiner

P. R. GILLIAM, Assistant Examiner

U.S. Cl. X.R.

250—203; 350—2, 7, 27, 44, 199